(12) United States Patent
Kanigicherla et al.

(10) Patent No.: US 8,990,459 B2
(45) Date of Patent: Mar. 24, 2015

(54) PERIPHERAL DEVICE SHARING IN MULTI HOST COMPUTING SYSTEMS

(75) Inventors: Balaji Kanigicherla, Andhra Pradesh (IN); Krishna Mohan Tandaboina, Andhra Pradesh (IN); Siva Raghuram Voleti, Andhra Pradesh (IN); Chandra Kumar Chettiar, Andhra Pradesh (IN); Surya Narayana Dommeti, Andhra Pradesh (IN); Kishor Arumilli, Andhra Pradesh (IN); Dhanumjai Pasumarthy, Andhra Pradesh (IN); Rajani Lotti, Andhra Pradesh (IN)

(73) Assignee: Ineda Systems Pvt. Ltd, Hyderabad, Andhra Pradesh (IN)

( * ) Notice: Subject to any disclaimer, the term of this patent is extended or adjusted under 35 U.S.C. 154(b) by 0 days.

(21) Appl. No.: 14/114,743

(22) PCT Filed: Apr. 30, 2012

(86) PCT No.: PCT/IN2012/000319
§ 371 (c)(1),
(2), (4) Date: Oct. 29, 2013

(87) PCT Pub. No.: WO2012/150608
PCT Pub. Date: Nov. 8, 2012

(65) Prior Publication Data
US 2014/0068317 A1 Mar. 6, 2014

(30) Foreign Application Priority Data

Apr. 30, 2011 (IN) ............................ 1347/CHE/2011
Apr. 30, 2011 (IN) ............................ 1388/CHE/2011

(51) Int. Cl.
*G06F 13/00* (2006.01)
*G06F 13/10* (2006.01)
*G06F 9/50* (2006.01)
*G06F 11/07* (2006.01)

(52) U.S. Cl.
CPC .............. *G06F 13/10* (2013.01); *G06F 9/5011* (2013.01); *G06F 11/0793* (2013.01)

USPC .............................................. 710/62; 710/108

(58) Field of Classification Search
USPC ................................................... 710/37, 108
See application file for complete search history.

(56) References Cited

U.S. PATENT DOCUMENTS

| 2008/0147887 A1 | 6/2008 | Freimuth et al. |
| 2008/0147943 A1 | 6/2008 | Freimuth et al. |
| 2008/0148295 A1 | 6/2008 | Freimuth et al. |

FOREIGN PATENT DOCUMENTS

WO 2011022375 2/2011

OTHER PUBLICATIONS

International Search Report, PCT/IN2012/000319, Chinese International Search Authority, Completed Sep. 29, 2012, Mailed Oct. 18, 2012.
Written Opinion of the International Search Report for PCT/IN2012/000319 mailed Oct. 18, 2012.

*Primary Examiner* — Ernest Unelus
(74) *Attorney, Agent, or Firm* — Workman Nydegger (57) ABSTRACT

The present subject matter discloses methods and systems of sharing of peripheral devices in multi host computing systems (100). In one implementation, the method of sharing a peripheral device (116) amongst a plurality of hosts of the multi-host computing system (100) comprises receiving a request to switch the peripheral device (116) from a first operating system running on a first host from amongst the plurality of hosts to a second operating system running on a second host from amongst the plurality of hosts; generating a request for the first operating system to relinquish control of the peripheral device (116); determining the status of the relinquishment based on response generated by the first operating system; initiating a request for the second operating system to install a device driver for the peripheral device (116) upon determining successful relinquishment; and transferring ownership of the peripheral device (116) to the second operating system.

17 Claims, 8 Drawing Sheets

PERIPHERAL DEVICE SHARING IN MULTI HOST COMPUTING SYSTEMS

RELATED APPLICATION INFORMATION

This application claims priority to and the benefit of PCT Application Serial No. PCT/IN2012/000319, filed on Apr. 30, 2012, entitled "PERIPHERAL DEVICE SHARING IN MULTI HOST COMPUTING SYSTEMS", which also claims priority to and the benefit of Indian Patent Application No. 1347/CHE/2011, entitled "PERIPHERAL DEVICE SHARING IN MULTI HOST COMPUTING SYSTEMS", filed on Apr. 30, 2011, and Indian Patent Application No. 1388/CHE/2011, entitled "SWITCHING CONTROL OF A PERIPHERAL DEVICE", which are incorporated herein in their entirety.

FIELD OF INVENTION

The present subject matter relates to sharing of peripheral devices, particularly but not exclusively, to sharing of peripheral devices in multi host computing systems running multiple operating systems.

BACKGROUND

Computing systems, such as laptops, netbooks, workstations, are usually connected to various peripheral devices to enhance functionalities which leads to a better experience in using the computing systems. Peripheral devices include but are not limited to Universal Serial Bus (USB) devices, mouse, keyboard, internal and external storage devices, printers, scanners, display units, audio systems, etc.

Generally, the peripheral devices are virtualized by software tool, such as a hypervisor, to enable multiple hosts to share the same system resources. The hypervisor or a virtual machine monitor (VMM) provides a platform for isolated execution of system images and manages access between the system images and the attached peripheral devices. Standards for PCIe based peripheral virtualization, where multiple system images are implemented on a single processor, are specified by Peripheral Component Interconnect Special Interest Group (PCI-SIG) in the single root input-output virtualization (SR-IOV) standard. However, the overhead of such virtualization techniques results in lesser performance and consume higher computer resources in terms of processing power consumed and memory usage.

The capabilities of the SR-IOV standard have been extended by a multi root input-output virtualization (MR-IOV) standard to allow virtualization of the peripheral devices between multiple processors based on the standards of MR-IOV provided by the PCI-SIG. However the MRIOV standard defines only the mechanisms to access the device controller register space by different hosts but not the mechanism to be followed by each device controller to allow device sharing across the hosts. Moreover for a shared peripheral device, transferring the ownership dynamically from a powered off host to an active host is difficult to implement in conventional systems.

SUMMARY

This summary is provided to introduce concepts related to peripheral device sharing in multi host computing systems running multiple operating systems. This summary is not intended to identify essential features of the claimed subject matter nor is it intended for use in determining or limiting the scope of the claimed subject matter.

In an embodiment, a peripheral and interface virtualization unit (PIVU) for sharing a peripheral device amongst a plurality of hosts in a multi-host computing system comprises a system and device manager (SDM) configured to control switching of the peripheral device from a first operating system running on a first host from amongst the plurality of hosts to a second operating system running on a second host from amongst the plurality of hosts and route instructions generated by at least one of the plurality of hosts to the peripheral device based in part on an activity state of the peripheral device and power state of the peripheral device. The PIVU further comprises, a device data repository configured to store at least one of the power state of the peripheral device, the activity state of the peripheral device, a sharing mode of the of the peripheral device, default ownership of the of the peripheral device and power management schemes supported by the peripheral device.

In another embodiment, a multi-host computing system configured to manage switching of a peripheral device among a first processor and a second processor from amongst a plurality of processors comprises a device selection unit configured to provide a switch request associated with the peripheral device, wherein the switch request is indicative of switching the peripheral device from the first processor to the second processor and a multiplexer unit coupled to the device selection unit and a plurality of host controllers, wherein each of the plurality of host controllers is associated with at least one of the first processor and the second processor. In said implementation, the multiplexer unit comprises a switching module configured to receive switch request from the device selection unit to switch the peripheral device from the first processor to the second processor and send a disconnect request to the first processor upon receiving the switch request, wherein the disconnect request is sent to logically disconnect the peripheral device from the first processor.

BRIEF DESCRIPTION OF THE FIGURES

The detailed description is described with reference to the accompanying figures. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computing system or processor, whether or not such computing system or processor is explicitly shown.

DETAILED DESCRIPTION

Systems and methods for peripheral device sharing in multiple host computing systems running multiple operating systems are described herein. The systems and methods can be implemented in a variety of computing devices such as laptops, desktops, workstations, tablet-PCs, smart phones, etc. Although the description herein is with reference to certain computing systems, the systems and methods may be implemented in other electronic devices, albeit with a few variations, as will be understood by a person skilled in the art.

In general, peripheral device virtualization relates to a capability of the peripheral devices to be used by more than one system image, in other words, by more than one operating system executing on a single processor. Conventionally, a virtualization intermediary (VI) or a hypervisor, such as a virtual machine monitor (VMM), is used to enable sharing of the peripheral devices connected to the single processor. For a single root peripheral virtualization, where multiple system images work on a single processor and share virtualized peripheral devices, a single root input-output virtualization (SR-IOV) has been developed by the Peripheral Component Interconnect Special Interest Group (PCI-SIG).

Additionally, the standards for virtualizing peripheral devices and further, routing information between the virtualized peripheral devices and the multiple processor s based on PCIe protocol has been defined by the PCI-SIG in the multi-root I/O virtualization (MR-IOV) standard. Conventional techniques of sharing peripheral devices among multiple hosts include using a software tool, such as a hypervisor, to share the peripheral devices. Other conventional techniques include sharing a peripheral device owned by a host over a network such that the peripheral device can be accessed and used by the other hosts. However, the conventional techniques of peripheral device sharing require both the hosts to be in an active state. If a host is powered off, all the peripheral devices owned by the powered off host cannot accessed or used by other hosts.

The present subject matter discloses methods and systems of peripheral device sharing in multiple host computing systems running multiple operating systems. The system is designed to be used with peripheral component interconnect (PCI) compliant, peripheral component interconnect express (PCIe) compliant, non-PCI compliant and non-PCIe compliant peripherals.

Various types of peripheral devices may be connected to the system. For example, the multi host computing system may include or may be connected to various storage controllers, like Serial Advanced Technology Attachments (SATA), NAND flash memory, multimedia cards (MMC), Consumer Electronics Advanced Technology Attachment (CEATA); connectivity modules like baseband interfaces, Serial Peripheral Interfaces (SPI), Inter-integrated Circuit (I2C), infrared data association (IrDA) compliant devices; media controllers like camera, integrated inter chip sound (I2S); media accelerators like audio encode-decode engines, video encode-decode engines, graphics accelerator; security modules like encryption engines, key generators; communication modules like Bluetooth, Wi-Fi, Ethernet; universal serial bus (USB) connected devices like pen drives, memory sticks, etc.

The system, according to an embodiment of the present subject matter, comprises at least a first processor, a second processor, memory coupled to each of the processors, an intelligent peripheral controller unit, henceforth referred to as IPCU, electronically connected to at least one of the first processor and the second processor, at least one interface to facilitate connection and communication with external systems, peripherals, networks, etc., wherein at least one of the connected peripherals facilitate user interaction with the system. The peripherals are also referred to as input output devices (I/O devices). In one implementation, the second processor is located inside the IPCU.

The system, according to an embodiment of the present subject matter, enables a peripheral device to be shared among multiple hosts. Further the system facilitates the changing of ownership of a peripheral device from one host to another. Moreover, the system also allows recovery of peripheral devices in case the peripheral device moving into an error state. In case of switching of operating system, say from a first operating system OS-A to a second operating system OS-B, the system allows seamless transfer of the peripheral devices from one host to another. These and other advantages will be described in greater details in conjunction with the following figures. It should be noted that the description and figures merely illustrate the principles of the present subject matter. It will thus be appreciated that those skilled in the art will be able to devise various arrangements that, although not explicitly described or shown herein, embody the principles of the present subject matter and are included within its spirit and scope.

Figure 1A:
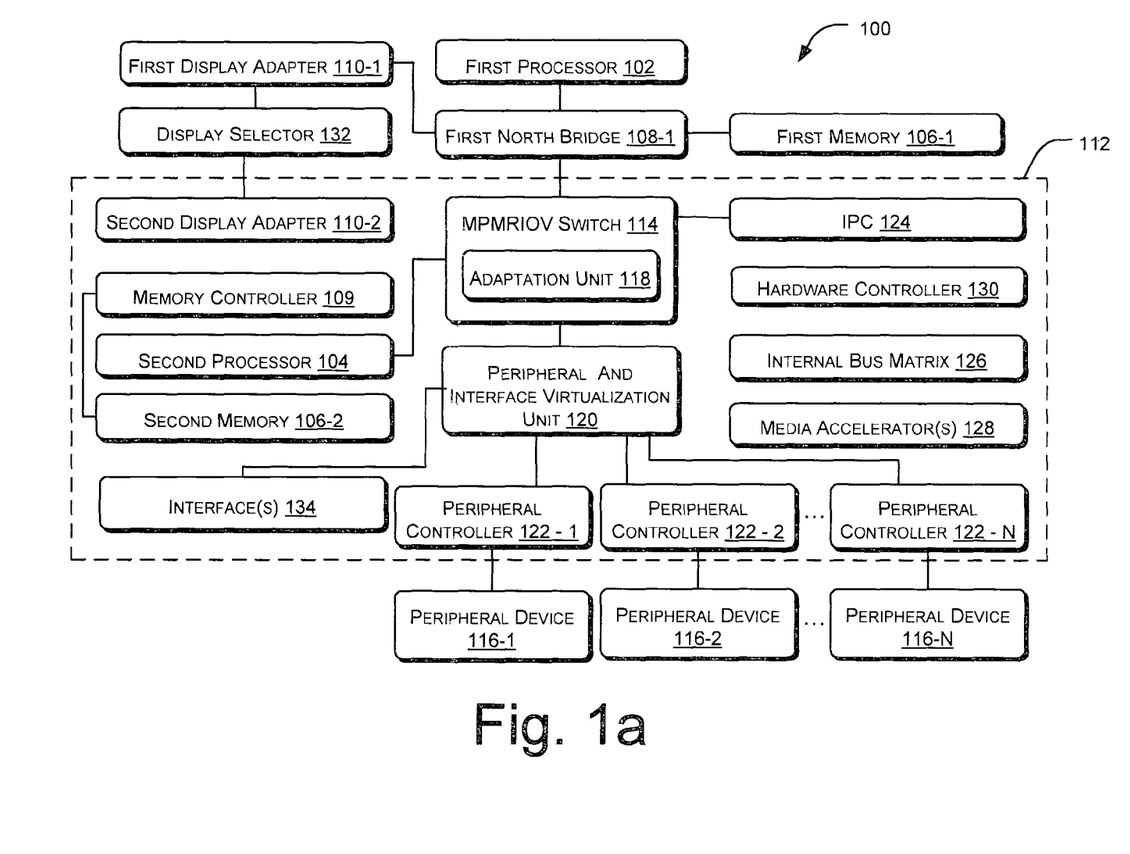
FIG. 1a shows the exemplary components of a multi host computing system, in accordance with an embodiment of the present subject matter.

FIG. 1a shows the exemplary components of the multi host computing system, henceforth referred to as the system, 100, according to an embodiment of the present subject matter. The system 100 can either be a portable electronic device, like laptop, notebook, netbook, tablet computer, etc., or a non-portable electronic device like desktop, workstation, server, etc. The system 100 comprises a first processor 102 and a second processor 104. The first processor 102 and the second processor 104 are coupled to a first memory 106-1 and a second memory 106-2 respectively.

The first processor 102 and the second processor 104 can be implemented as one or more microprocessors, microcomputers, microcontrollers, digital signal processors, central processing units, state machines, logic circuitries, or any devices that manipulate signals based on operational instructions. Among other capabilities, the first processor 102 and the second processor 104 can be configured to fetch and execute computer-readable instructions and data stored in the first memory 106-1 and the second memory 106-2 respectively.

The first memory 106-1 and the second memory 106-2 can include any computer-readable medium known in the art including, for example, volatile memory (e.g., RAM) and/or non-volatile memory (e.g., flash, etc.). The first memory 106-1 and the second memory 106-2 include various modules to provide multiple functionalities to the system 100. The modules usually includes routines, programs, objects, components, data structure, etc., that perform particular task or implement particular abstract data types.

The system 100 further comprises a first north bridge 108-1 that connects the first processor 102 with the first memory 106-1 and facilitates communication between a first display adapter 110-1 and the first processor 102. The display adapter 110-1 transmits display or video signals to an external visual display unit (not shown in the figure). The first north bridge 108-1 is connected to an intelligent peripheral controller unit (IPCU) 112. In one implementation, the IPCU 112 is connected to the first north bridge 108-1 through another component like a south bridge or an input/output controller hub or an equivalent thereof.

The IPCU 112 includes a multi-protocol multi-root input output virtualization (MPMRIOV) switch 114, which facilitates the communication of the system 100 with one or more connected peripheral devices 116-1, 116-2, . . . 116-N, collectively referred to as peripheral devices 116. It may be mentioned that Peripheral Component Interconnect Special Interest Group (PCI-SIG), an electronics industry consortium responsible for specifying the Peripheral Component Interconnect (PCI) and Peripheral Component Interconnect Express (PCIe) computer buses, states multi-root input output virtualization (MR-IOV) as the industry standard for enabling virtualization of peripherals among multiple processors.

The MR-IOV switch 114 comprises an adaptation unit 118, which facilitates communication with peripheral devices 116, that may be non-PCI and non-PCIe compliant peripherals, with the system 100. A peripheral and interface virtualization unit 120 is coupled to a plurality of peripheral controllers 122-1, 122-2, . . . 122-N, collectively referred to as peripheral controllers 122. The peripheral and interface virtualization unit 120 helps in virtualization of the physical peripheral devices and facilitates simultaneous sharing of peripheral devices, like printers, keyboard, mouse, display unit, etc., among multiple operating systems or multiple processors. The system 100 may also include other components 120 required to provide additional functionalities to the system 100.

In one embodiment, the IPCU 112 may include the second processor 104, having a memory controller 109, which facilitates connection of the second processor 104 to the second memory 106-2 and a second display adapter 110-2. The IPCU 112 helps in simultaneous sharing of peripheral devices 116 among the first processor 102 and the second processor 104. Integrating the second processor 104 in the IPCU 112 reduces power consumption and chip area thus making the system 100 more economic and compact. In other implementations the second processor 104 may be outside the IPCU 112. Also the second processor can be configured to share the first memory 106-1 with the first processor 102.

The IPCU 112 also includes an inter processor communication unit (IPC) 124 for exchange of messages between the first processor 102 and second processor 104, an internal bus matrix 126 for communicating with various system resources, at least one media accelerator 128 for enhancing media processing like audio processing, at least one hardware controller 130 to interact with system resources, the peripheral controllers 122 and the peripheral and interface virtualization unit 120. The IPCU 112 may also include other components required to provide additional functionalities to the system 100.

In the said embodiment the system 100 includes a display selector 132, which facilitates control and flow of display signals from the first display adapter 110-1 and the second display adapter 110-2 to a visual display unit (not shown in figure). The visual display unit includes but is not limited to cathode ray tube (CRT) monitors, liquid crystal display (LCD) screens, plasma screens, projectors, high-definition multimedia interface (HDMI) compliant devices, video graphics array (VGA) compliant devices etc. Other embodiments with integrated display adapter or visual display unit or both are also possible. Additionally the system 100 may have one or more interfaces 134 to connect to external network, systems, peripherals, devices, etc.

Figure 1B:
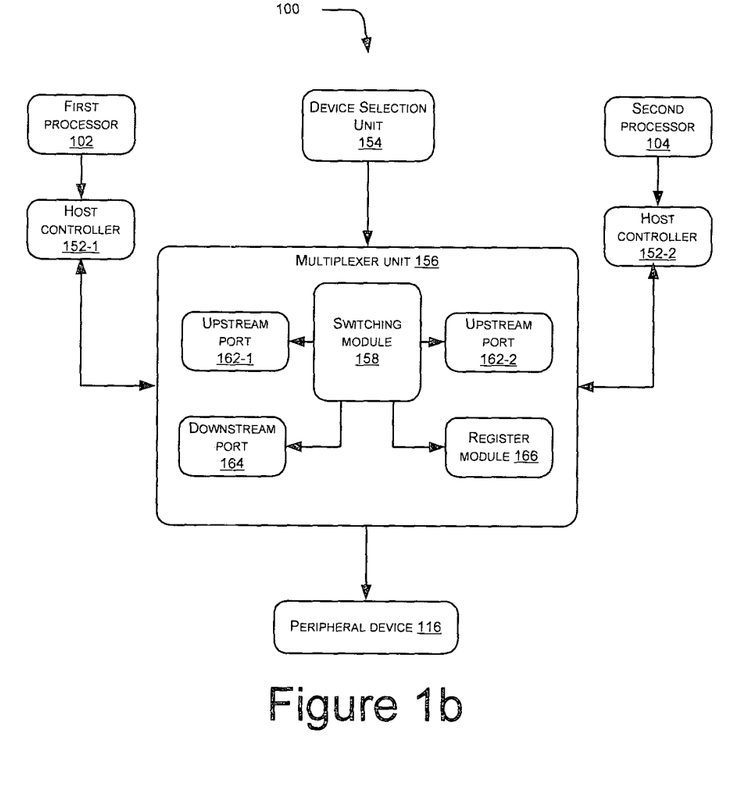
FIG. 1b shows the exemplary components of the multi host computing system, in accordance with another embodiment of the present subject matter.

The system 100 may support different modes of peripheral sharing between the host processors. A simultaneously shared peripheral may be simultaneously owned by the host processors. A serially shared peripheral may be owned by one host processor at a time. To this end, FIG. 1*b* depicts the components of multi host computing system 100 configured to manage switching the control of the serially shared peripheral device 116 between a plurality of multi processors, such as the first processor 102 and the second processor 104, according to an implementation of the present subject matter. In said implementation, the system 100 may be communicatively coupled to one or more peripheral device(s) 116, for example, USB devices, NAND flash devices, storage devices, communication devices, human interface devices, audio devices, etc. The system 100 also includes the first processor 102 and the second processor 104.

Further, the system 100 hereinafter, includes a multiplexer unit 156 and a plurality of host controllers 152 specific to each processor 102 and 104. For example, the host controller 152-1 acts as an interface between the first processor 102 and the multiplexer unit 156 to allow communication between the first processor 102 and the peripheral device 116. Similarly, the host controller 152-2 acts as an interface between the second processor 104 and the multiplexer unit 156 to allow communication between the second processor 104 and the peripheral device 116. In one implementation, the multiplexer unit 156 may be implemented as a sub-module of either or both the host controllers 152. In another implementation, the multiplexer unit 156 may be implemented as a sub-module of a single host controller (not shown) which interfaces with plurality of host processors.

The system 100 further includes a device selection unit 154 connected to the multiplexer unit 156, which provides a switch request from a user to the multiplexer unit 156 to switch the control of the peripheral device 116 from the first processor 102 to the second processor 104, and vice versa. In one implementation, the device selection unit 154 can be a hardware unit or a software unit coupled with a hardware unit. Alternatively, the switch request can be, generated by an application residing on either of the plurality of processors 102 and 104. Based on the switch request sent by the device selection unit 154, the multiplexer unit 156 allows switching the control of the peripheral device 116 between the first processor 102 and the second processor 104, with no intercommunication between the processors 102 and 104. For example, if the first processor 102 is currently in communication with the peripheral device 116 and the user requests access to the peripheral device 116 through the second processor 104, then the multiplexer unit 156 sends a disconnect request to the first processor 102. The first processor 102 may have to relinquish the peripheral device 116.

To this end, the multiplexer unit 156 includes an upstream port 162-1 connected to the host controller 152-1, another upstream port 162-2 connected to the host controller 152-2, and a downstream port 164 connected to the peripheral device 116. In case of a USB peripheral device, the upstream port 162-1, the upstream port 162-2, and the downstream port 164 may be implemented based on USB 2.0 transceiver macro cell interface and UTMI low pin interface. Further, the downstream port 164 for a USB device can be a USB PHY port (not shown in figure).

Further the multiplexer unit 156 includes a register module 166 configured to store the requests, manage the traffic of requests sent back and forth and constantly update the ownership status of the peripheral device 116 with respect to the system 100. The register module 166 may store the switch request from the device selection unit 154 in case the switching module 158 is processing another prior switch request from the device selection unit 154. In one implementation, the multiplexer unit 156 includes a switching module 158. The switching module 158 is configured to manage and co-ordinate amongst the device selection unit 154, the register module 166, the upstream port 162-1, the upstream port 162-2, and downstream port 164. In one implementation, the functionalities of the device selection unit 154 may be implemented in the PIVU 120.

In order to allow switching of the control of the peripheral device 116 between the two processors 102 and 104, the multiplexer unit 156 connects the first processor 102 and the second processor 104 to the peripheral device 116 in such a way that from the perspective of each of the processors 102 and 104, the peripheral device 116 appears as if it is dedicated to each of the processors 102 and 104. Whereas from the perspective of the peripheral device 116, it appears that all transfers are being initiated by a single processor.

In operation, the switching module 158 within the multiplexer unit 156 receives the switch request from the user through the device selection unit 154. In another implementation, the switching module 158 within the multiplexer unit 156 receives a switch request from either of the processors 102 and 104. The switching module 158 then determines the current processor owning the peripheral device 116 by fetching data from the configuration registers stored in the register module 166 of the multiplexer unit 156. In said example, the configuration registers suggest that the first processor 102 is currently using the peripheral device 116. The switching module 158 sends a disconnect request to the host controller 152-1 through the upstream port 162-1. In case the peripheral device 116 is a NAND flash device, the switching module 158 sends a un-mount request to the first processor 102. Further, the switching module 158 sends a connect request to the second processor 104 after receiving a successful completion indication from the first processor 102.

In one implementation, subsequent to the disconnect request, the host controller 152-1 determines if there are any pending commands (e.g., commands related to writing data on to the peripheral device 116) at the host controller 152-1. If there are no pending commands, the peripheral device 116 is disconnected from the first processor 102. However, if there are any pending commands, the switching module 158 waits for a predetermined time interval to allow the host controller 152-1 to complete the pending commands. Such a time interval may be governed by the switching boundaries (not shown in figure), which may vary based on the peripheral device 116. For example, for a USB and SD devices, the boundaries may be class specific.

In one implementation, the disconnect request is generated to the multiplexer unit 156 at a switching boundary. For example, a request to connect the peripheral to the second processor 104 is sent to the first processor 102 through an inter processor communication channel (not shown in the figure). Once the request is received, the first processor 102 may relinquish the control over the peripheral device 116 based on a safe removal request initiated by a device handover application (not shown) running on the first processor 102, based on this request device removal process may takes place. Once the removal is complete, a request is sent to the multiplexer unit 156 through the switching module 158 which indicates that the peripheral device 116 may be safely removed without any loss of data.

If the first processor 102 does not process the safe removal request or sends a safe removal failure notification, then the switching module 158 generates an error message to indicate that the peripheral device 116 cannot be removed as completion of pending commands at the first processor 102 level may be critical. In such a scenario, the switching module notifies to the second processor 104 via the host controller 152-2 that the peripheral device 116 may be unavailable and the second processor 104 may re-try after predefined intervals.

On the other hand, if the safe removal is successful as per the switching boundaries, the multiplexer unit 156 disconnects the host controller 152-1 from the peripheral device 116 via the upstream port 162-1. The first processor 102 perceives the disconnection of the peripheral device 116 from the host controller 152-1 as if the peripheral device 116 is removed even though the peripheral device 116 is still present physically.

Further, once the host controller 152-1 has, disconnected from the peripheral device 116, the switching module 158 sends a connect request to the host controller 152-2 through the upstream port 162-2. After the second processor 104 and the peripheral device 116 have established the communication path as per the switching boundaries, the switching module 158 updates the configuration registers within the register module 166 with the details of the newly established connection. It will be understood that even though the description is provided with reference to the first processor 102 having initial access to the peripheral device 116, but in other implementations, the second processor 104 may have initial access.

Figure 2A:
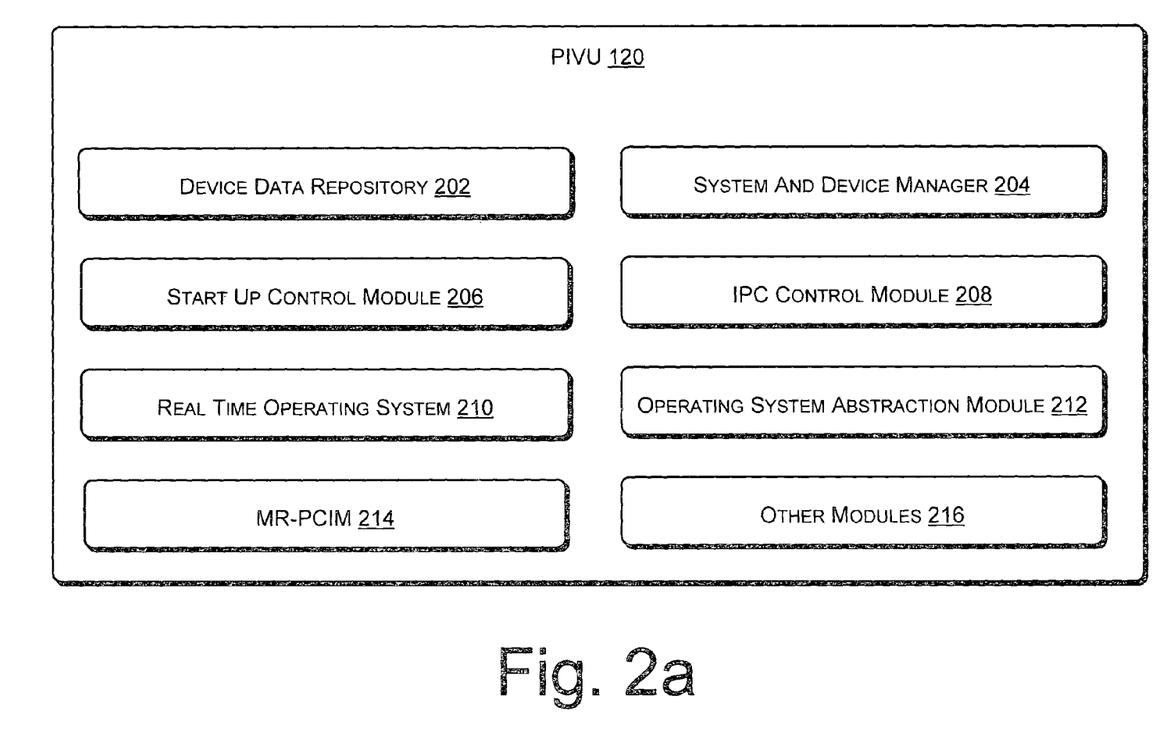
FIG. 2a shows the exemplary components of an intelligent peripheral controller unit according to an embodiment of the present subject matter.

FIG. 2a shows the exemplary components of the peripheral and interface virtualization unit 120, henceforth referred to as the PIVU 120, according to an embodiment of the present subject matter. In one embodiment, the PIVU 120 may be implemented as a hardware module or a software module or as a firmware.

In one embodiment, the PIVU 120 includes a device data repository 202, henceforth referred to as the DDR 202. The DDR 202 stores the state and the ownership data of the peripheral devices. For example, the DDR 202 may store the type of the peripheral device, such as universal serial bus (USB) device, serial advanced technology attachment (SATA) device, etc. The DDR 202 also maintains details about the peripheral devices and the current ownership of a peripheral device. Default ownership specifies the processor which would be assigned the ownership of a peripheral device when the system 100 is initially booted or when both the first processor 102 and the second processor 104 are active or when there is a conflict. For example, the default ownership of the Universal Serial Bus (USB) unit may be the first processor 102, whereas the current ownership of the USB unit may be with the second processor 104. Further the DDR 202 also maintains the power status of the device. For example, in one implementation, the system 100 may use power management schemes which comply with Advanced Configuration and Power Interface (ACPI) specifications. In said implementation the DDR 202 may store the power status of the peripheral device 116 as D0 which indicates that the peripheral device 116 is fully on or as D1 or D2 which indicates that the peripheral device 116 is in an intermediate power state or as D3 which indicates that the peripheral device 116 is switched off or powered off. Further, the DDR 202 also stores the mode of sharing of the peripheral device 116. For example, a peripheral device 116 can be shared between multiple processors using serial or simultaneous or virtual sharing mechanisms. The DDR 202 also maintains the current state of the peripheral device 116 such as whether the peripheral device 116 is fully active or is in a low power/dormant state or has encountered an error.

The PIVU 120 also includes a system and device manager 204, henceforth referred to as SDM 204. The SDM 204 may be implemented as a hardware module or a software module or a firmware. The SDM 204 is assigned the responsibility of receiving, analyzing and processing various instructions and commands which may be issued by any of the first processor 102 and second processor 104, peripheral controllers 122, MPMRIOV switch 108, etc., based partly on the power state of the peripheral devices 116, power state of the system 100, etc. Further, the SDM 204 also coordinates various functions such as switching of a peripheral device 116 from the first processor 102 to the second processor 04 or vice-versa, or switch of operating systems, etc.

In said implementation, the PIVU 120 includes a start up control module 206. The start up control module 206 controls various operations during the boot up process of the system 100. For example, the start up control module 206 assigns the ownership of various peripheral devices 116 connected to the system 100 to either of the first processor 102 or the second processor 104. In one embodiment, the PIVU 120 also includes a IPC control module 208. The IPC control module 208 controls the operations of the IPC 124. The IPC control module 208 implements a protocol for the exchange of information between the PIVU 120 and the operating systems running on each of the first processor 102 and the second processor 104. In one implementation, the IPC control module 208 is implemented as a physical interconnect, low latency bus between the PIVU 120 and the first processor 102 and the second processor 104.

In one embodiment, the PIVU 120 includes a real time operating system 210, henceforth referred to as RTOS 210. The RTOS 210 is an operating system intended to serve real-time application requests such as a user input or a command. The RTOS 210 generally has a consistency regarding the amount of time it takes to accept and complete an application's task.

Further, in said embodiment, the PIVU 120 also includes an operating system abstraction layer 212, henceforth referred to as OSAL 212. The OSAL 212 makes the PIVU 120 compatible with different kinds of RTOS 210 and operating systems running on the first processor 102 and the second processor 104. However embodiments of the PIVU 120 without the OSAL 212 are also possible.

In one embodiment, the PIVU 120 also includes a Multi Root PCIe manager module 214, henceforth referred to as the MR-PCIM 214. The MR-PCIM 214 controls the MPMRIOV switch 114 and facilitates the communication between any of the first processor 102 and second processor 104 with the peripheral devices 116. Further the MRPCIM 214 also controls the various configuration settings of the MPMRIOV switch 114.

In one embodiment, the PIVU 120 may also include other modules 216, such as MRIOV wrapper for various types of non-MRIOV peripheral controllers 122, implementing the necessary functionality for sharing the peripherals 116 across the hosts. Thus the PIVU 120 enables the system 100 to seamlessly transfer a peripheral device 116, from one processor to another, for example, from the first processor 102 to the second processor 104. Also the PIVU 120 facilitates the sharing of peripheral devices 116 by both the first processor 102 and the second processor 104 simultaneously.

Figure 2B:
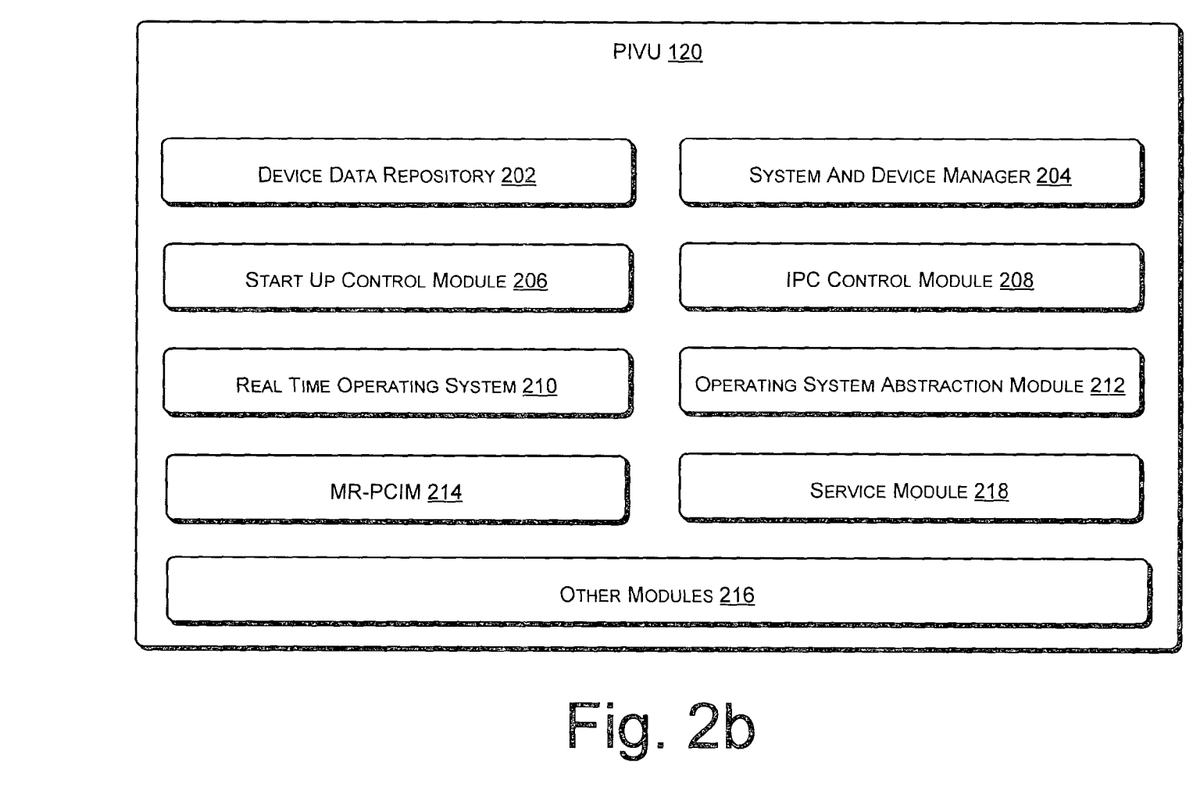
FIG. 2b illustrates exemplary components of a intelligent peripheral controller unit, according to another embodiment of the present subject matter.

FIG. 2b shows the exemplary components of the peripheral and interface virtualization unit 120, henceforth referred to as the PIVU 120, according to another embodiment of the present subject matter. In one embodiment, the PIVU 120 may be implemented as a hardware module or a software module or as a firmware. In said embodiment, the PIVU 120 enables simultaneous sharing of non-MRIOV peripheral device 116. The PIVU 120 includes a service module 218. In one embodiment, the service module 218 is implemented as a high sped, low latency data communication mechanism.

In operation, the PIVU 120 configures the service module 218 so that it mimics a peripheral device 116. The service module 218 may be configured to make multiple copies of the peripheral device 116 such that each of the first processor 102 and the second processor 104 can dedicatedly access and control a copy of the peripheral device 116. This would enable a non MRIOV peripheral device 116 to be configured as a serially shared or parallel shared MRIOV peripheral device 116.

In said embodiment, the PIVU 120 may also include peripheral drivers. This would enable the PIVU to directly control and communicate with a peripheral device 116. Also the PIVU 120 may run network services which would configure the SERVICE MODULE 218 to mimic a network device such as a L2 switch, etc. Further the IPC control module 208 may also configure the IPC 124 to mimic a network device such as a L2 switch, etc. Thus in this configuration, the first processor 102 and the second processor 104 may share peripheral devices 116 over a network as done conventionally.

Figure 3:
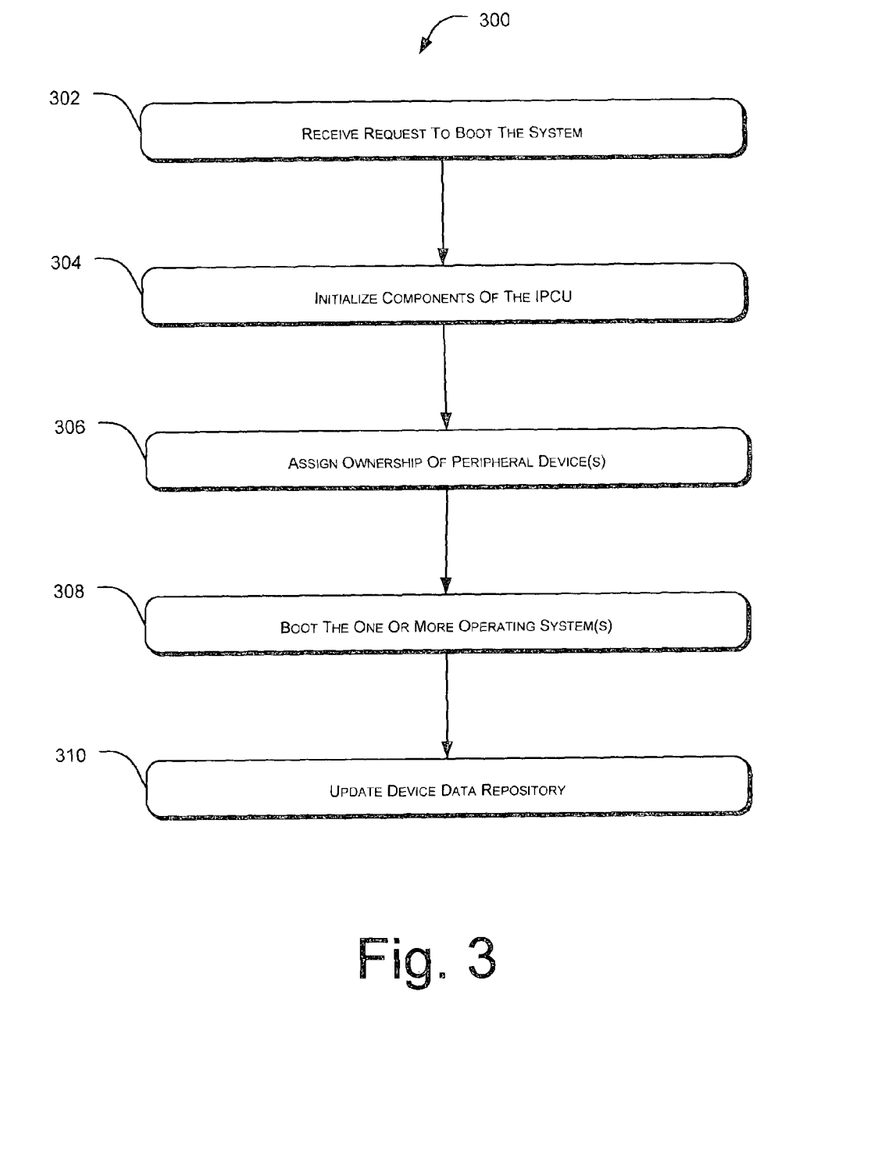
FIG. 3 illustrates an exemplary method for booting the multi host computing system, according to an embodiment of the present subject matter.

FIG. 3 illustrates an exemplary method 300 for booting the system 100, according to an embodiment of the present subject matter. The method 300 may be described in the general context of computer executable instructions. Generally, computer executable instructions can include routines, programs, objects, components, data structures, procedures, modules, functions, etc., that perform particular functions or implement particular abstract data types. The method 300 may also be practiced in a distributed computing environment where functions are performed by remote processing devices that are linked through a communications network. In a distributed computing environment, computer executable instructions may be located in both local and remote computer storage media, including memory storage devices.

The order in which the method 300 is described is not intended to be construed as a limitation, and any number of the described method blocks can be combined in any order to implement the method 300, or an alternative method. Additionally, individual blocks may be deleted from the method 300 without departing from the spirit and scope of the subject matter described herein. Furthermore, the method 300 can be implemented in any suitable hardware, software, firmware, or combination thereof. For the sake of explanation and clarity, it is assumed that a first operating system, OS-A runs of the first processor 102 and a second operating system OS-B runs on the second processor 104.

At block 302, the IPCU 112 receives a request for boot up the system 100. The request can be in form of a hardware or software trigger. The components of the IPCU 112 are initialized and the peripherals 116, the MPMRIOV switch 114 and the IPC 124 are set to their default state as specified in the configuration of the IPCU 112, as shown in block 304.

As shown in block 306, the PVIU 120 will assign the ownership of the peripheral devices 116 to either of the first processor 102 and the second processor 104 based on pre-defined system configuration. The pre-determined configuration may also include denial of the ownership of a peripheral device to a particular host. For example, in one implementation, the pre-defined system configuration may be static, for example factory settings of the system 100, whereas in another example the pre-defined system configuration may be dynamically loaded from the Basic Input Output System (BIOS) of the system 100. Further, the user may perform field changes once the system 100 is outside the factory. The field changes may be understood as changes made in the configuration of the system 100 by the user, for example, through upgrades the BIOS or the firmware of the system 100. As shown in block 308, the PVIU 120 would initiate the booting of one or more operating systems. In one implementation, the PVIU 120 boots any one of the operating system, say OS-A, as specified in the pre-defined system configuration. In another implementation, the PVIU 120 can be configured to boot all the operating systems, i.e. OS-A and OS-B, simultaneously. In yet another implementation, the PVIU 120 may be configured to initially boot any one of the operating systems, say OS-A, and after a pre-defined time delay, may boot the other operating system, say OS-B. Further the PVIU 120 may also initiate the implementation of various power schemes for the system 100. As shown in the block 310, the PVIU 120 also updates the DDR 202. This facilitates any of the operating systems to check the status of the peripheral devices 116. Moreover, any of the operating systems may initiate the change in activity or power state of a peripheral device 116 and update the DDR 202 accordingly.

Figure 4:
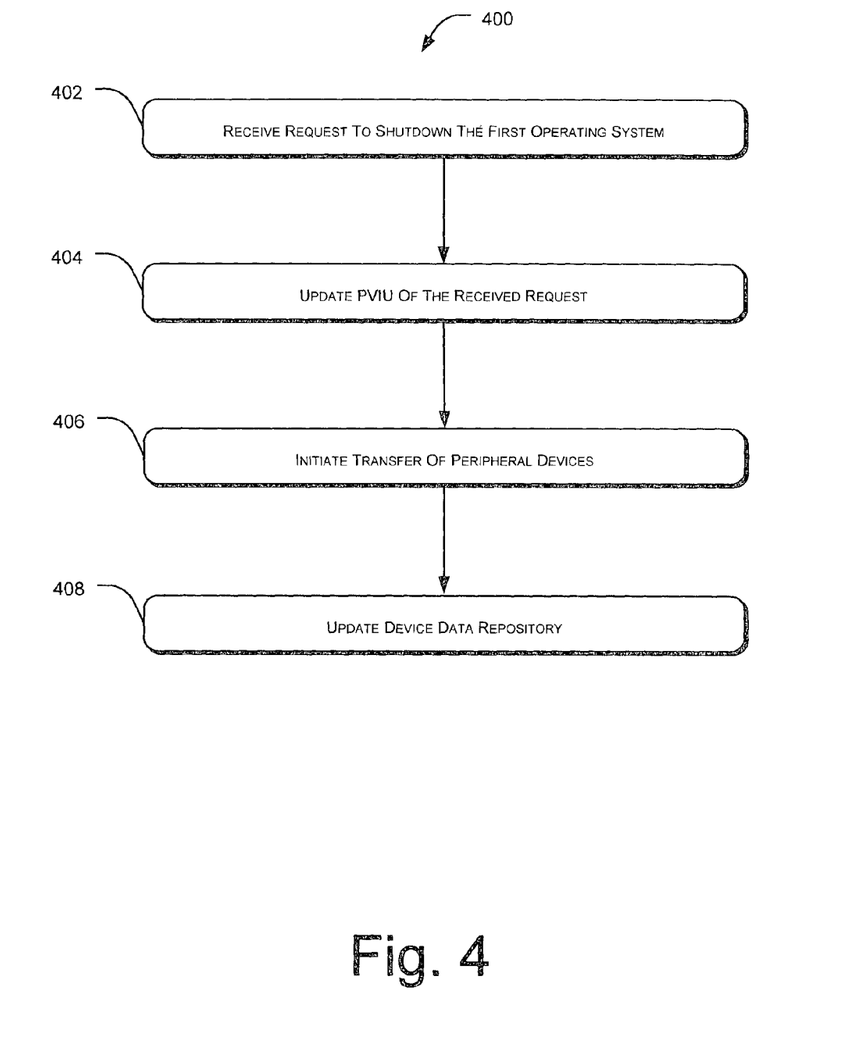
FIG. 4 illustrates an exemplary method for shutting down an operating system running on the multi host computing system, according to an embodiment of the present subject matter.

FIG. 4 illustrates an exemplary method 400 for shutting down an operating system running on the system 100, according to an embodiment of the present subject matter, according to an embodiment of the present subject matter. The method 400 may be described in the general context of computer executable instructions. Generally, computer executable instructions can include routines, programs, objects, components, data structures, procedures, modules, functions, etc., that perform particular functions or implement particular abstract data types. The method 400 may also be practiced in a distributed computing environment where functions are performed by remote processing devices that are linked through a communications network. In a distributed computing environment, computer executable instructions may be located in both local and remote computer storage media, including memory storage devices.

The order in which the method 400 is described is not intended to be construed as a limitation, and any number of the described method blocks can be combined in any order to implement the method 400, or an alternative method. Additionally, individual blocks may be deleted from the method 400 without departing from the spirit and scope of the subject matter described herein. Furthermore, the method 400 can be implemented in any suitable hardware, software, firmware, or combination thereof. For the sake of explanation and clarity, it is assumed that a first operating system, OS-A runs of the first processor 102 and a second operating system. OS-B runs on the second processor 104.

At block 402, the system 100 receives a request to shutdown any one of the operating system, say OS-A. The shutdown can be triggered by a hardware switch or a software simulated event. In one embodiment, a driver running on the operating systems updates the PVIU 120 about the shutdown as shown in block 404. In another embodiment, the PVIU may monitor activity over the IPC 124 and in case of prolonged inactivity of the IPC 124, the PIVU 120 may determine one of the operating systems to be in a shutdown state. As shown in block 406, the PIVU 120 initializes and coordinates the transfer of peripheral devices 116 from one operating system to another, say from OS-A to OS-B. In one implementation, the PIVU 120 may be configured to automatically initiate the transfer of peripheral devices 116 from one operating system to another, whereas in another embodiment, the PIVU 120 may transfer of peripheral devices 116 from one operating system to another based on user input. As depicted in block 408, the PIVU 120 updates the DDR 202 with the updates activity status and current ownership details of the peripheral devices 116.

Figure 5:
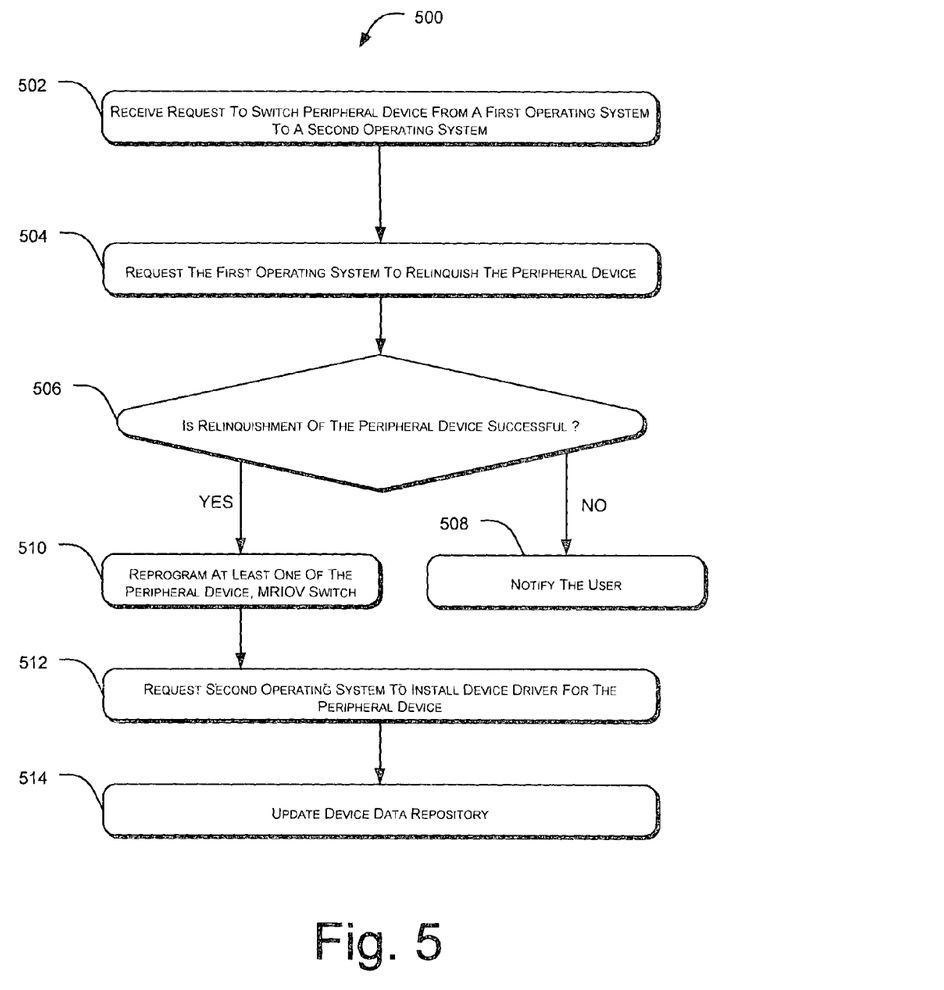
FIG. 5 illustrates an exemplary method for switching a peripheral device from one operating system to another operating system, according to an embodiment of the present subject matter.

FIG. 5 illustrates an exemplary method 500 for switching a peripheral device 116 from one operating system to another, according to an embodiment of the present subject matter. The method 500 may be described in the general context of computer executable instructions. Generally, computer executable instructions can include routines, programs, objects, components, data structures, procedures, modules, functions, etc., that perform particular functions or implement particular abstract data types. The method 500 may also be practiced in a distributed computing environment where functions are performed by remote processing devices that are linked through a communications network. In a distributed computing environment, computer executable instructions may be located in both local and remote computer storage media, including memory storage devices.

The order in which the method 500 is described is not intended to be construed as a limitation, and any number of the described method blocks can be combined in any order to implement the method 500, or an alternative method. Additionally, individual blocks may be deleted from the method 500 without departing from the spirit and scope of the subject matter described herein. Furthermore, the method 500 can be implemented in any suitable hardware, software, firmware, or combination thereof. For the sake of explanation and clarity, it is assumed that a first operating system, OS-A runs of the first processor 102 and a second operating system OS-B runs on the second processor 104.

At block 502, the system 100 receives a request to switch a peripheral device 116, say a universal serial bus (USB) device, from one operating system to another, say from OS-A to OS-B. For example, a widget running on OS-A or OS-B may be used to facilitate the request. In one embodiment, the request is received by the PIVU 120. In another embodiment, the request may be communicated to the PIVU 120 by the IPC 124. The PIVU 120 retrieves the current ownership details of the peripheral device 116 from the DDR 202 and confirms if the OS-A is the current owner of the USB device. On confirmation that USB device is sharable to the OS-B, based on ownership configuration, the PIVU 120 initiates and sends a request to the OS-A to relinquish the USB Device. In one embodiment, the PIVU 120 may update the status of the peripheral device 116 to indicate that the peripheral device 116 is in transit. In certain cases such as an operating system power cycle in progress, a peripheral device 116 driver initialization in progress, the OS-A may reject the request for relinquishment outright. As depicted in block 506, the PIVU 120 determines if the relinquishment of the peripheral device 116, in this example the USB device, is successful. Sometimes the OS-A is unable to complete the relinquishment of the peripheral device 116 for various reasons such as any application may be accessing the peripheral device 116 or there is a write operation in progress, etc. In such cases, as depicted in block 508, the user is notified of the failure to switch the peripheral device 116 from OS-A to OS-B.

If the relinquishment of the peripheral is successful, the OS-A communicates the successful relinquishment status to the PIVU 120. As depicted in block 510, the PIVU 120 will reprogram the MR-IOV switch or the peripheral device 116 or both so that the peripheral device 116 may be switched to OS_B. The reprogramming may optionally include resetting the peripheral device or the peripheral controller or the MRIOV switch port. In one embodiment, the PIVU 120 may generate an interrupt or any other conventional form of hardware trigger to initiate the reprogramming. As shown in block 512, the PIVU 120 sends a request to the OS-B to install device drivers for the peripheral device 116 so as to enable the OS-B to control the peripheral device 116 directly. As illustrated in block 514, the PIVU 120 updates the DDR 202 regarding the new ownership and activity status of the peripheral device 116. In one implementation, the PIVU 120 may also send a message indicating the successful switch of the peripheral device 116 to OS-A.

In certain cases, the peripheral device 116 may move to an error state during the switching of the peripheral device 116 or during normal operation. For example, in certain cases, the device driver of OS-B may fail to load or the peripheral device 116 may not respond to control commands. In one implementation, the PIVU 120 would notify the user of the error state of the peripheral device 116. In cases of error of the peripheral device 116, the OS-B communicates the same to the PIVU 120 over the IPC 124. The PIVU 120 validates the error status of the peripheral device 116 and proceeds with the device recovery. In one implementation, the PIVU 120 may initiate hardware triggers which would allow OS-B to reinstall the device drivers so as to facilitate OS-B to connect to and control the peripheral device 116.

Figure 6:
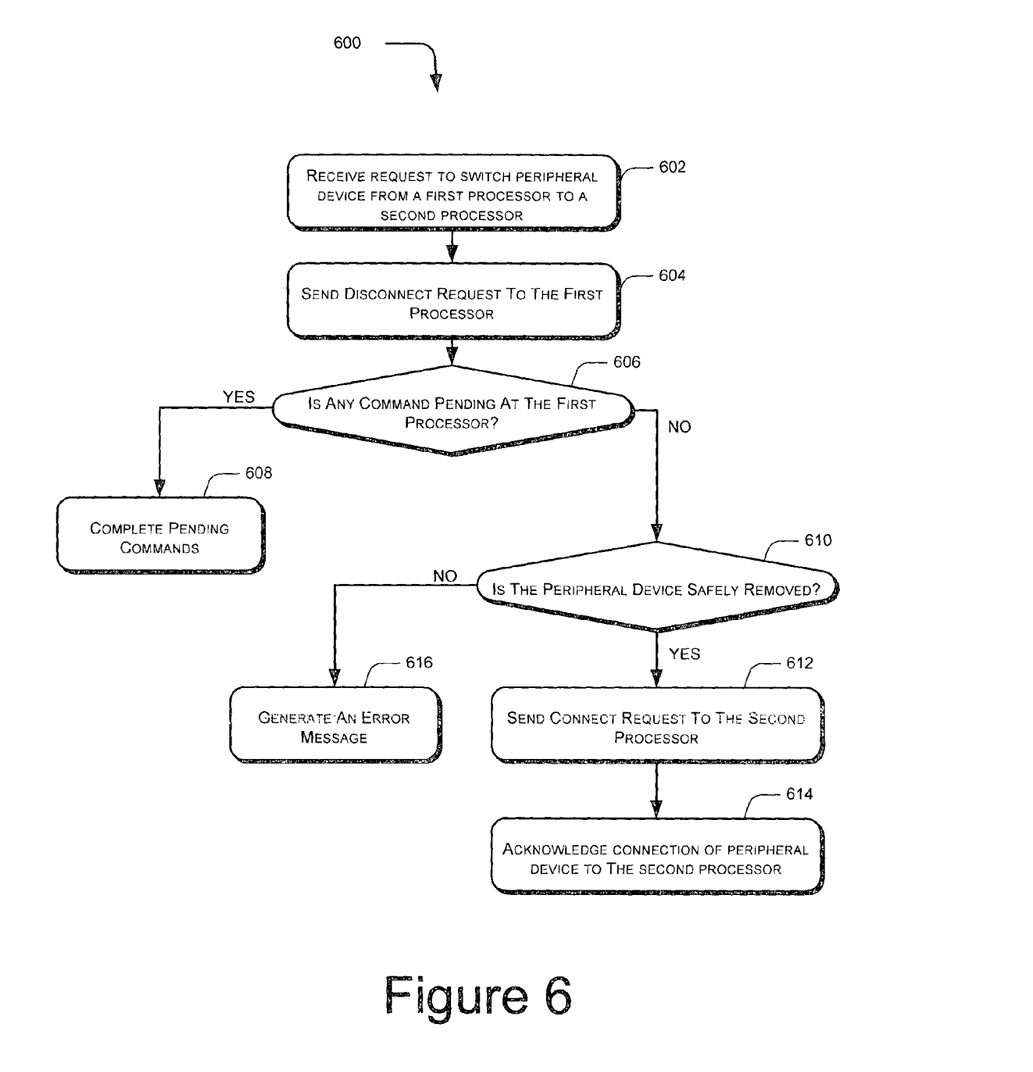
FIG. 6 illustrates an exemplary method for switching a peripheral device from one operating system to another operating system, according to another embodiment of the present subject matter.

FIG. 6 illustrates an exemplary method 600 for switching of a peripheral device between a first processor (102) and a second processor (104), according to an embodiment of the present subject matter. The method 600 may be implemented for removable peripheral devices which inherently support signaling to the operating system during insertion/removal events of the removable peripheral devices. In such cases, the PIVU 120 may be configured not to unload/load the device drivers for the removable peripheral devices. The exemplary method 600 may be described in the general context of computer executable instructions embodied on a computer-readable medium. Generally, computer executable instructions can include routines, programs, objects, components, data structures, procedures, modules, functions, etc., that perform particular functions or implement particular abstract data types. The method 600 may also be practiced in a distributed computing environment where functions are performed by remote processing devices that are linked through a communications network. In a distributed computing environment, computer executable instructions may be located in both local and remote computer storage media, including memory storage devices.

The order in which the method 600 is described is not intended to be construed as a limitation, and any number of the described method blocks can be combined in any order to implement the method 600, or an alternative method. Additionally, individual blocks may be deleted from the method 600 without departing from the spirit and scope of the method, systems and devices described herein. Furthermore, the method 600 can be implemented in any suitable hardware, software, firmware, or combination thereof.

Additionally, the method 600 has been described in the context of the multi-host computing system 100 and the multiplexer unit 156; however, other embodiments may also be possible as will be understood by a person skilled in the art.

At block 602, a request to switch peripheral device from a first processor to a second processor is received. In one implementation, the request is received by a multiplexer unit 156 to switch the peripheral device 116 from the first processor 102 to the second processor 104, of the system 100. In said example, the request may indicate that the second processor 104 is attempting to access the data stored on the peripheral device 116. In said implementation, the request may be generated by the device selection unit 154 that can be a hardware unit or a software unit coupled with a hardware unit. Alternatively, the switch request can be generated by an application residing on either of the plurality of processors 102 and 104. Based on the switch request, the multiplexer unit 156 allows switching the control of the peripheral device 116 between the first processor 102 and the second processor 104, with no intercommunication between the processors 102 and 104.

At block 604, a disconnect request is sent to the first processor 102. In one implementation, based on the received request, the multiplexer unit 156 may send a disconnect request for the peripheral device 116, to the first processor 102. Upon receiving the disconnect request to release the control of the peripheral device 116, the first processor 102 may initiate an internal process to commit the final release of the peripheral device 116. In one embodiment, the switching module 158 of the multiplexer unit 156 may identify the command boundary of any command of first processor 102 in execution and send the disconnect request to the first processor 102 after execution of the command till the identified boundary.

At block 606, it is determined whether any command is pending at the first processor 102 to be executed by the peripheral device. For example, the first processor 102 would determine if any request is pending for the peripheral device 116 to be executed. In case the determination is positive, the control flows to block 608 ("Yes" branch). However, in case of a negative determination, the control flows to block 610 ("No" branch). In one example, after the disconnect request is sent by the switching module 158, the first processor 102 determines if any command is pending that is needed to be executed by the peripheral device 116. In a scenario when a command is pending, the first processor 102 may not release the control of the peripheral device 116.

At block 608, the pending command is completed. In one implementation, the first processor 102, upon receiving the disconnect request, determines the commands which are pending and need to be completed before the release of control. Based on the determination, the first processor 102 sends the pending command to the peripheral device 116 for completion and then releases the control of the peripheral device 116.

At block 610, it is determined whether the peripheral device 116 is safely disconnected with respect to the first processor 102. If the determination is negative, the control flows to block 612 ("No" branch). However, in case of a positive determination, the control flows to block 614 ("Yes" branch). In one implementation, the switching module 158 determines whether the peripheral device 116 is safely removed from the first processor 102.

At block 612, a connect request to the second processor 104 is sent. In one implementation, the peripheral device 116 is connected to the second processor 104 based on the connect request received from the switching module 158. In one example, the switching module 158, after establishing a connection between the peripheral device 116 and the second processor 104, initializes the configuration registers according to second processor 104. In one example, the peripheral device can be a USB device which gets enumerated by the second processor 104 after connection.

At block 614, connection between the peripheral device 116 and the second processor 104 is acknowledged. In one example, the multiplexer unit 156 acknowledges that the peripheral device 116 is connected to the second processor 104.

At block 616, an error message is generated. In one implementation, the error message is generated to report to the second processor 104 that the safe removal has failed at block 610. In said implementation, the generation of the error message terminates the process of switching the peripheral device 116. However, in one implementation, the switching module notifies to the second processor 104 via the host controller 152-2 that the peripheral device 116 may be unavailable and the second processor 104 may re-try after predefined intervals.

Although implementations for sharing of peripheral devices in multi host computing systems running multiple operating systems have been described in language specific to structural features and/or methods, it is to be understood that the appended claims are not necessarily limited to the specific features or methods described. Rather, the specific features and methods are disclosed as exemplary implementations for sharing of peripheral devices.

We claim:

1. A method of sharing a peripheral device amongst a plurality of hosts in a multi-host computing system, the method comprising:
   receiving a switching request from at least one amongst the plurality of hosts, by at least one of a peripheral and interface virtualization unit (PIVD), and a switching module, to switch the peripheral device from a first operating system running on a first host from amongst the plurality of hosts to a second operating system running on a second host from amongst the plurality of hosts;
   generating a request based on ownership configuration for the first operating system to relinquish ownership of the peripheral device at a safe transaction boundary;
   determining the status of the relinquishment based in part on response generated by the first operating system;
   storing the switching request, by a register module, while the switching module is processing another prior switching request;
   initiating a request for the second operating system to install a device driver for the peripheral device upon determining successful status of the relinquishment; and
   transferring ownership of the peripheral device to the second operating system by reprogramming at least one of the PIVU and the peripheral device.

2. The method as claimed in claim 1, wherein the method further comprises updating a device data repository maintained by the PIVU.

3. The method as claimed in claim 1, wherein the method further comprises:
   determining an activity status of the peripheral device with respect to the first operating system upon receiving the request for relinquishment; and
   masking the request on determining the peripheral device to be in use by at least one of the first operating system and an application running on the first operating system.

4. The method as claimed in claim 1, wherein the method further comprises:
   determining an error in the peripheral device, wherein the peripheral device moves to an error state;
   ascertaining a cause of the error state of the peripheral device; and
   initiating device recovery process for the peripheral device based in part on the ascertaining.

5. The method as claimed in claim 1, wherein the switching request may be generated by at least one of a first host from amongst the plurality of hosts owning the peripheral device, a second host from amongst the plurality of hosts requesting ownership of the peripheral device, and a third host from amongst the plurality of hosts which does not own the peripheral device and has not requested for the ownership of the peripheral device.

6. The method as claimed in claim 1, wherein the method further comprises:
   assigning ownership of the peripheral device to at least one of the plurality of hosts on receiving a request to boot the multi-host computing system; and
   updating a device data repository maintained by the PIVU based on the assigning.

7. The method as claimed in claim 1, wherein the method further comprises:
   receiving a request to shutdown the first host;
   initiating transfer of ownership, by the PIVU, of the peripheral device from the first host to the second host; and
   updating a device data repository maintained by the PIVU based on the transfer.

8. A peripheral and interface virtualization unit (PIVU) for sharing a peripheral device amongst a plurality of hosts in a multi-host computing system, the PIVU comprising:
   a system and device manager (SDM) configured to:
      control switching of the peripheral device from a first operating system running on a first host from amongst the plurality of hosts to a second operating system running on a second host from amongst the plurality of hosts;
      route instructions generated by at least one of the plurality of hosts to the peripheral device based in part on an activity state of the peripheral device and power state of the peripheral device;
   a device data repository (DDR) configured to store at least one of the power state of the peripheral device, the activity state of the peripheral device, a sharing mode of the of the peripheral device, default ownership of the peripheral device and power management schemes supported by the peripheral device; and
   a service module configured to set the peripheral device as at least one of a serially shared device and a parallel shared device with respect to at least one of the plurality of hosts; wherein the plurality of hosts simultaneously identify the peripheral device as a dedicated peripheral device when set as the parallel shared device by the service module; and wherein the plurality of hosts simultaneously send a switching request to switch processing requests to the peripheral device.

9. The PIVU as claimed in claim 8, further comprising a start up control module configured to assign ownership of the peripheral device at time of booting of the multi-host computing system based in part on default ownership of the of the peripheral device retrieved from the device data repository.

10. The PIVU as claimed in claim 8, further comprising an operating system abstraction layer configured to implement compatibility with a plurality of operating systems running on the multi-host computing system, based in part on emulation of functionalities of plurality of operating systems.

11. The PIVU as claimed in claim 8, further comprising a service module configured to generate a plurality of copies of the peripheral device, wherein each of the plurality of copies of the peripheral device is dedicatedly used and managed by at least one of the plurality of hosts.

12. The PIVU as claimed in claim 8, further comprising a Multi Root PCIe manager (MRPCIM) module configured to control data transfer between the peripheral device and at least one of the plurality of hosts.

13. A multi-host computing system configured to manage switching of a peripheral device among a first processor (102) and a second processor from amongst a plurality of processors, comprising:
   a device selection unit configured to provide a switch request associated with the peripheral device, wherein the switch request is indicative of switching the peripheral device from the first processor to the second processor; and
   a multiplexer unit coupled to the device selection unit and a plurality of host controllers, wherein each of the plurality of host controllers is associated with at least one of the first processor and the second processor, the multiplexer unit comprising:
      a switching module configured to:
         receive switch request from the device selection unit to switch the peripheral device from the first processor to the second processor;
         send a disconnect request to the first processor upon receiving the switch request, wherein the disconnect request is sent to logically disconnect the peripheral device from the first processor; a register module configured to
         maintain an ownership status of the peripheral device, wherein the ownership status defines a processor from amongst the plurality of processors associated with the peripheral device; and
         store the switch request, while the switching module is processing another prior switch request from the device selection unit.

14. The multi-host computing system as claimed in claim 13, wherein the switching module further comprises:
   a plurality of upstream ports, wherein each the plurality of upstream ports is associated with a corresponding host controller from amongst the plurality of host controllers, wherein each of the upstream port is configured to exchange data between at least one of the first processor and the second processor; and the multiplexer unit through the corresponding host controller; and
   a downstream port configured to exchange data between the multiplexer unit and the peripheral device, wherein the downstream port receives data from one of the plurality of upstream ports associated with the corresponding host controller.

15. The multi-host computing system as claimed in claim 13, wherein each of the host controller is configured to:
   receive the disconnect request for the first processor from the switching module; and
   provide the disconnect request to the first processor based on status of a pending command from the host processor first processor for the peripheral device.

16. The multi-host computing system as claimed in claim 15, wherein the providing is further based on graceful command boundary of the pending requests.

17. The multi-host computing system as claimed in claim 15, wherein the multiplexer unit is implemented as a sub-module of a host controllers, wherein the host controllers is communicatively coupled to at least one of the plurality of processors.

* * * * *